(12) United States Patent
Wang et al.

(10) Patent No.: US 12,537,534 B2
(45) Date of Patent: Jan. 27, 2026

(54) CIRCUITS AND METHODS FOR PHASE INTERPOLATORS AND GENERATING QUADRATURE CLOCK SIGNALS

(71) Applicant: The Trustees of Columbia University in the City of New York, New York, NY (US)

(72) Inventors: Zhaowen Wang, Sunnyvale, CA (US); Peter Kinget, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 178 days.

(21) Appl. No.: 18/103,448

(22) Filed: Jan. 30, 2023

(65) Prior Publication Data
US 2023/0246649 A1    Aug. 3, 2023

Related U.S. Application Data

(60) Provisional application No. 63/304,695, filed on Jan. 30, 2022.

(51) Int. Cl.
*H03L 7/099* (2006.01)
*H03L 7/081* (2006.01)

(52) U.S. Cl.
CPC .......... *H03L 7/0998* (2013.01); *H03L 7/0818* (2013.01)

(58) Field of Classification Search
CPC ... H03L 7/0998; H03L 7/0818; H03L 7/0812; H03K 5/131; H04L 7/0025; H04L 7/002; H04L 7/0016; H04L 7/0008
See application file for complete search history.

(56) References Cited

U.S. PATENT DOCUMENTS

| 8,867,668 B2 | 10/2014 | Beukema et al. |
| 9,369,263 B1 | 6/2016 | Baecher et al. |
| 9,444,435 B1 | 9/2016 | Monaco et al. |

(Continued)

OTHER PUBLICATIONS

Abidi, A.A., "Phase Noise and Jitter in CMOS Ring Oscillators", In IEEE Journal of Solid-State Circuits, vol. 41, No. 8, Aug. 2006, pp. 1803-1816.

(Continued)

*Primary Examiner* — Jung Kim
(74) *Attorney, Agent, or Firm* — Byrne Poh LLP (57) ABSTRACT

Phase interpolators are provided, the phase interpolators including: a first phase interpolator having a first output that outputs a first interpolated clock signal based on quadrature clock signals and a first phase interpolator control signal; a second phase interpolator having a second output that outputs a second interpolated clock signal based on the quadrature clock signals and a second phase interpolator control signal that is shifted from the first phase interpolator control signal by half of an integral nonlinearity (INL) period of the first phase interpolator; and a phase combiner that outputs a third interpolated clock signal based on the first interpolated clock signal and the second interpolated clock signal. In some of these embodiments, the phase interpolators further comprise a first amplitude limiter that receives the first interpolated clock signal and outputs a first amplitude-limited interpolated clock signal that is provided to the phase combiner.

13 Claims, 12 Drawing Sheets

(56) References Cited

U.S. PATENT DOCUMENTS

| | | |
|---|---|---|
| 9,608,644 B1 | 3/2017 | Raj et al. |
| 10,014,868 B1 | 7/2018 | Raj |
| 10,469,096 B1 | 11/2019 | Ghittori et al. |
| 2009/0289672 A1* | 11/2009 | Hua .................. H03L 7/099 327/147 |
| 2016/0211967 A1 | 7/2016 | Huang et al. |
| 2017/0026048 A1 | 1/2017 | Huang |

OTHER PUBLICATIONS

Auvergne, D., et al., "Signal Transition Time Effect on CMOS Delay Evaluation", In IEEE Transactions on Circuits System 1, Fundamental Theory Applications, vol. 47, No. 9, Sep. 2000, pp. 1362-1369.

Bulzacchelli, J., et al., "A 10-Gb/s 5-tap DFE/4-tap FFE Transceiver in 90-nm CMOS Technology", In the IEEE Journal of Solid-State Circuits, vol. 31, No. 12, Dec. 2006, pp. 2885-2900.

Casper, B., and O'Mahony, F., "Clocking Analysis, Implementation and Measurement Techniques for High-Speed Data Links—a tutorial," In IEEE Transactions on Circuits Systems I, vol. 56, No. 1, Jan. 2009, pp. 17-39.

Cevrero, A., et al., "A 100Gb/s 1.1pJ/b PAM-4 RX with Dual-Mode 1-Tap PAM-4/3-Tap NRZ Speculative DFE in 14nm CMOS FinFET", In IEEE International Solid-State Circuits Conference, Feb. 17-21, 2019, pp. 112-114.

Chen, S., et al., "A 4-to-16GHz Inverter-Based Injection-Locked Quadrature Clock Genreator with Phase Interpolators for Multi-Standard I/Os in 7nm FinFET", In IEEE International Solid-State Circuits Conference, Feb. 11-15, 2018, pp. 390-392.

Dunwell, D., and Carusone, A.C., "Modeling Oscillator Injection Locking using the Phase Domain Response", In IEEE Transactions Circuits System 1 Reg. Papers, vol. 60, No. 11, Nov. 2013, pp. 2823-2833.

Gaddam, A., et al., "Wireless Sensors Networks Based Monitoring: Review, challenges and implementation issues", In IEEE International Conference on Sensing Technology, Tainan, TW, Nov. 30-Dec. 3, 2008, pp. 533-538.

Gangasani, G.R., et al., "A 16-Gb/s Backplane Transceiver with 12-Tap Current Integrating DFE and Dynamic Adaptation of Voltage Offset and Timing Drifts in 45-nm SOI CMOS Technology", In IEEE Journal of Solid-State Circuits, vol. 47, No. 8, Aug. 2012, pp. 1828-1841.

Gao, X., et al., "Jitter Analysis and a Benchmarking Figure-of-Merit for Phase-Locked Loops", In IEEE Transactions on Circuits Systems II, Exp. Briefs, vol. 56, No. 2, Feb. 2009, pp. 117-121.

Groen, E., et al., "A 10-to-112Gb/s DSP-DAC-Based Transmitter with 1.2Vppd Output Swing in 7nm FinFET", In IEEE International Solid-State Circuits Conference Digital Technical Papers, Feb. 2020, pp. 120-122.

Homayoun, A., and Razavi, B., "Relation between Delay Line Phase Noise and Ring Oscillator Phase Noise", In IEEE Journal of Solid-State Circuits, vol. 49, No. 2, Feb. 2014, pp. 384-391.

Hossain, M., and Carusone, A.C., "CMOS Oscillators for Clock Distribution and Injection-Locked Deskew", In IEEE Journal of Solid-State Circuits, vol. 44, No. 8, Aug. 2009, pp. 2138-2153.

Huang, Y., and Chen, B., "An 8b Injection-Locked Phase Rotator with Dynamic Multiphase Injection for 28/56/112Gb/s Serdes Application", In IEEE International Solid-State Circuits Conference Digest Technical Papers, Feb. 2019, pp. 486-488.

Im, J., et al., "A 112-Gb/s PAM-4 Long-Reach Wireline Transceiver using a 36-Way Time-Interleaved SAR ADC and Inverter-Based RX Analog Front-End in 7-nm FinFET", In IEEE Journal of Solid-State Circuits, vol. 56, No. 1, Jan. 2021, pp. 7-18.

Jee, D., et al., "A 0.1-fref BW 1GHz Fractional-N PLL with FIR-embedded Phase-Interpolator-Based Noise Filtering", In IEEE International Solid-State Circuits Conference Digest Technical Papers, Feb. 2011, pp. 94-96.

Kim, J., et al., "A 224Gb/s DAC-Based PAM-4 Transmitter with 8-Tap FFE in 10nm CMOS", In IEEE International Solid-State Circuits Conference Digest Technical Papers, Feb. 2021, pp. 126-128.

Kinget, P., "Device Mismatch and Tradeoffs in the Design of Analog Circuits", In IEEE Journal of Solid-State Circuits, vol. 40, No. 6, Jun. 2005, pp. 1212-1224.

Li, C., et al., "Silicon Photonic Transceiver Circuits with Microring Resonator Bias-Based Wavelength Stabilization in 65nm CMOS", In IEEE Journal of Solid-State Circuits, vol. 49, No. 6, May 2014, pp. 1419-1436.

Monaco, E., et al., "A 2-11GHz 7-Bit-High-Linearity Phase Rotator Based on Wideband Injection-Locking Multi-Phase Generation for High-Speed Serial Links in 28-nm Cmos Fdsoi", In IEEE Journal of Solid-State Circuits, vol. 52, No. 7, Jun. 8, 2017, pp. 1739-1752.

O'Mahony, F., et al., "A Programmagle Phase Rotator based on Time-Modulated Injection-Locking", In Proceedings of the Symposium on VLSI Circuits, Jun. 2010, pp. 45-46.

Poon, C., et al., "A 1.24pJ/b 112Gb/s (870Gbps/mm) Transceiver for In-Package Links in 7nm FinFET", In Proceedings of the Symposium VLSI Circuits, Jun. 2021, pp. 1-2.

Raj, M., et al., "A 4-to-11GHz Injection-Locked Quarter-Rate Clocking for an Adaptive 153fJ/b Optical Receiver in 28nm Fdsoi Cmos", In IEEE International Solid-State Circuits Conference, Feb. 22-15, 2015, pp. 1-3.

Raj, M., et al., "A Wideband Injection Locked Quadrature Clock Generation and Distribution Technique for an Energy-Proportional 16-32Gb/s Optical Receiver in 28 nm FDSOI CMOS", In IEEE Journal on Solid-State Circuits, vol. 51, No. 10, Oct. 2016, pp. 2446-2462.

Schumacher, T., et al., "A Review of Ultra-Low-Power and Low-Cost Transceiver Design", In IEEE Austrochip, Oct. 2017, pp. 29-34.

Toprak-Deniz, J., et al., "A 128-Gb/s 1.3-pJ/b PAM-4 Transmitter with Reconfigurable 3-Tap FFE in 14-nm CMOS", In IEEE Journal of Solid-State Circuits, vol. 55, No. 1, Jan. 2020, pp. 19-26.

Wang, Z., and Kinget, P.R., "A 65nm MOS, 3.5-to-11GHz, Less-than-1.45LSB-INLpp, 7bit Twin Phase Interpolator with a Wideband, Low-Noise Delta Quadrature Delay-Locked Loop for High-Speed Data Links", In IEEE International Solid-State Circuits Conference on Digital Technical Papers, Feb. 2022, pp. 1-3.

Wang, Z., et al., "A High-Accuracy Multi-Phase Injection-Locked 8-Phase 7 GHz Clock Generator in 65 nm with 7 b Phase Interpolators for High-Speed Data Links", In IEEE International Solid-State Circuits Conference Digest Technical Papers, San Francisco, CA, US, Feb. 2021, pp. 186-188.

Wang, Z., et al., "Multi-Phase Clock Generation for Phase Interpolation with a Multi-Phase, Injection-Locked Ring Oscillator and a Quadrature DLL", In the IEEE Journal of Solid-State Circuits, vol. 57, No. 6, Jun. 2022, pp. 1776-1787.

Yoo, B., et al., "A 56Gb/s 7.7nmW/GB/s PAM-4 Wireline Transceiver in 10nm FinFET using MM-CDR-based ADC Timing Skew Control and Low-Power DSP with Approximate Multiplier", In IEEE International Solid-State Circuits Conference Digital Technical Papers, Feb. 2020, pp. 122-124.

* cited by examiner

CIRCUITS AND METHODS FOR PHASE INTERPOLATORS AND GENERATING QUADRATURE CLOCK SIGNALS

CROSS-REFERENCE TO RELATED APPLICATION

This application claims the benefit of U.S. Provisional Patent Application No. 63/304,695, filed Jan. 30, 2022, which is hereby incorporated by reference herein in its entirety.

BACKGROUND

Clock signals are critical components of a wide variety of electronic circuits. Adjusting the phase and the frequency of clock signals is important in a variety of applications. Phase interpolators are circuits that can adjust the phase and the frequency of clock signals as needed. However, many phase interpolators have undesirable nonlinearity and noise characteristics.

In many applications, quadrature clock signals need to be generated from non-quadrature clock signals.

Accordingly, new circuits and methods for phase interpolators and generating quadrature clock signals are desirable.

SUMMARY

In accordance with embodiment some embodiments, circuits and methods for phase interpolators and generating quadrature clock signals are provided.

In some embodiments, phase interpolators are provided, the phase interpolators comprising: a first phase interpolator having a first output that outputs a first interpolated clock signal based on quadrature clock signals and a first phase interpolator control signal; a second phase interpolator having a second output that outputs a second interpolated clock signal based on the quadrature clock signals and a second phase interpolator control signal that is shifted from the first phase interpolator control signal by half of an integral nonlinearity (INL) period of the first phase interpolator; and a phase combiner that outputs a third interpolated clock signal based on the first interpolated clock signal and the second interpolated clock signal. In some of these embodiments, the phase interpolators further comprise a first amplitude limiter that receives the first interpolated clock signal and outputs a first amplitude-limited interpolated clock signal that is provided to the phase combiner. In some of these embodiments, the phase interpolators further comprise a second amplitude limiter that receives the second interpolated clock signal and outputs a second amplitude-limited interpolated clock signal that is provided to the phase combiner. In some of these embodiments, the phase interpolators further comprise a programmable buffer that receives clock signals and provides to the first phase interpolator one of the quadrature clock signals. In some of these embodiments, the phase interpolators further comprise a multiplexer that receives a pair of input clock signals and outputs a pair of multiplexed clock signals having opposite phases from the pair of input clock signals. In some of these embodiments, the first phase interpolator comprises a first differential pair having inputs coupled to one of the quadrature clock signals and outputs coupled to the first output. In some of these embodiments, the first phase interpolator further comprises a second differential pair having inputs coupled to another of the quadrature clock signals and outputs coupled to the first output. In some of these embodiments, the first phase interpolator comprises a plurality of slices each comprising a first differential pair having inputs coupled to one of the quadrature clock signals and outputs coupled to the first output, and wherein the plurality of slices contribute to the first output based on first phase interpolator control signal. In some of these embodiments, the first phase interpolator further comprises a multiplexer.

In some embodiments, delay locked loops are provided, the delay locked loops comprising: a first passive mixer that mixes a pair of differential quadrature clock signals to produce a first output clock signal; a second passive mixer that mixes the pair of differential quadrature clock signals to produce a second output clock signal; and an operational transconductance amplifier that receives the first output clock signal and the second output clock signal and the produces a feedback signal that controls the one of the pair of differential clock signals. In some of these embodiments, delay locked loops further comprise a delay cell that receives the feedback signal and controls the one of the pair of differential clock signals based on the feedback signal. In some of these embodiments, the delay cell comprises: a differential inverter that outputs the one of the pair of differential clock signals at outputs of the differential inverter; and a differential varactor coupled to the output of the differential inverter and coupled to the feedback signal. In some of these embodiments, delay locked loops further comprise a delay cell that comprises: a differential inverter; and a switched load capacitor array connected to the output of the differential inverter, wherein an output of the delay cell produces a delayed clock signal upon which one of the differential quadrature clock signals is based.

DETAILED DESCRIPTION

Figure 1:
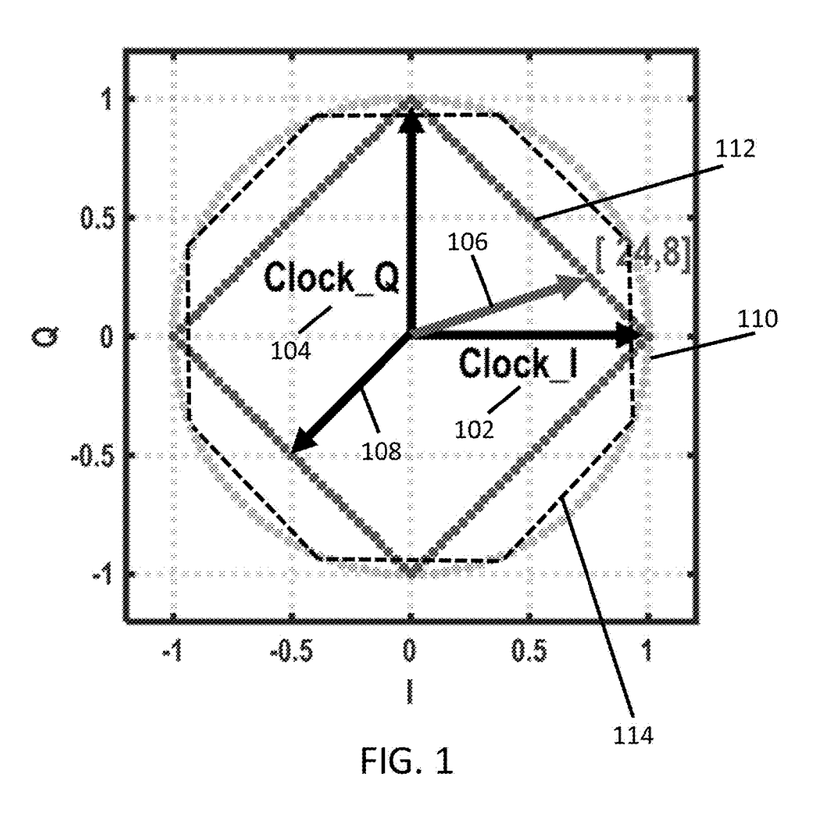
FIG. 1 is an illustration of phase interpolation in accordance with some embodiments.

In accordance with some embodiments, circuits and methods for phase interpolators (PIs) with nonlinearity cancellation and generating quadrature clock signals are provided. In some embodiments, PIs described herein generate clocks by summing up reference clocks weighted with different weights ωI or and ωQ. For example, as shown in FIG. 1, two 90 degree-spaced differential input clocks Clock_I 102 and Clock_Q 104 can be received by a PI, in some embodiments. A weight ωI can be applied to Clock_I and a weight ω$_Q$ can be applied to Clock_Q and then the weighted clocks can be summed to produce a resultant clock 106.

Figure 2:
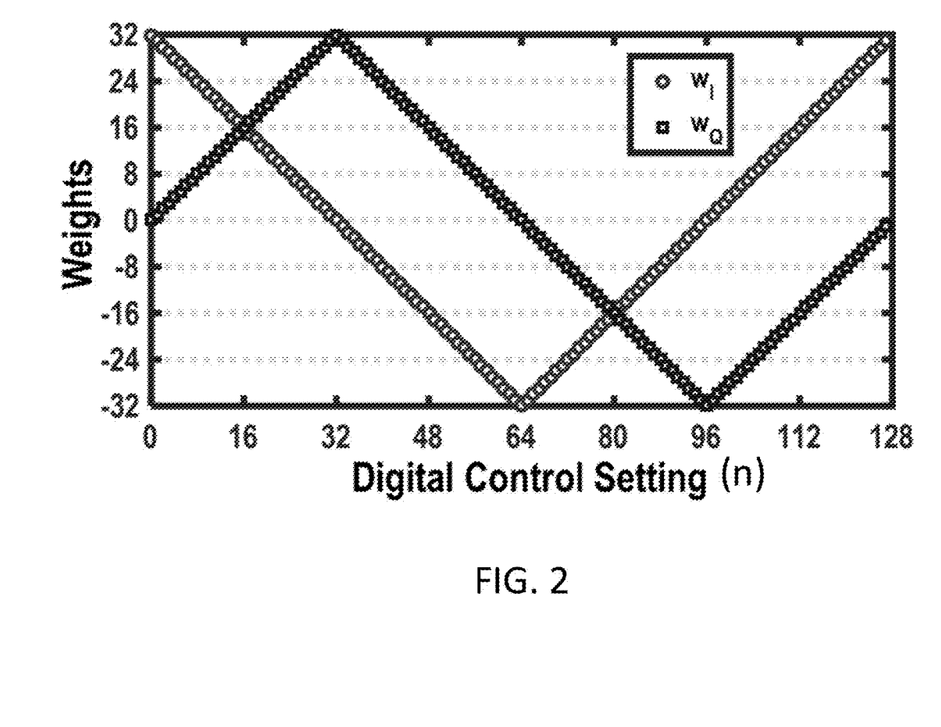
FIG. 2 is an illustration of 4-phase linear weights that can be used in some embodiments.

These weights ω$_I$ and ω$_Q$ can be any suitable values between a negative maximum weight value −ω$_{max}$ and a positive maximum weight value ω$_{max}$, in some embodiments. Any suitable ω$_{max}$ can be used in some embodiments. For example, if ω$_{max}$ is equal to 1, then weights ω$_I$ and ω$_Q$ can have values between −1 and +1. As another example, as shown in FIG. 2, if ω$_{max}$ is equal to 32, then weights ω$_I$ and ω$_Q$ can have values between −32 and +32. To produce a resultant clock 108 from Clock_I 102 and Clock_Q 104 as shown in FIG. 1, each of weights ω$_I$ and ω$_Q$ can be −0.5, for example.

In some embodiments, if the resultant clock only needs to be in the quadrant between the reference clocks (e.g., Quadrant 1 of FIG. 1 for Clock_I 102 and Clock_Q 104) weights ω$_I$ and ω$_Q$ can be any suitable positive values (e.g., values between zero and a positive maximum weight value ω$_{max}$). For example, if ω$_{max}$ is equal to 1, then weights ω$_I$ and ω$_Q$ can have values between 0 and +1. As another example, if ω$_{max}$ is equal to 32, then weights ω$_I$ and ω$_Q$ can have values between 0 and +32. As shown in FIG. 1, resulting clock 106 can be produced from Clock_I 102 and Clock_Q 104 using weights [ω$_I$,ω$_Q$] of [24,8] based on a ω$_{max}$ equal to 32. In some embodiments, when the reference clocks are multiplexed to other phases or flipped, then other quadrants can also be covered with positive weights. For example, in some embodiments, if Clock_I 102 is flipped by 180 degrees, and Clock_Q 104 stays the same, then Quadrant 2 of FIG. 1 can be covered with any suitable values of weights ω$_I$ and ω$_Q$. Or, the PI input can be multiplexed to the inverse phase of the Clock_I 102, and Clock_Q 104 stays the same, then Quadrant 2 of FIG. 1 can still be covered.

In some embodiments, for an N-bit PI, weights ω$_I$[n] and ω$_Q$[n] can vary sinusoidally with respect to a control code n from 0 to $2^N-1$ (i.e., 127 for N=7 bits). Such weights ω$_I$[n] and ω$_Q$[n] can be represented by the following equations:

$$\omega_I[n] = \omega_{max} * \cos\left(\frac{n}{2^N} \times 2\pi\right)$$

$$\omega_Q[n] = \omega_{max} * \sin\left(\frac{n}{2^N} \times 2\pi\right)$$

Using weights ω$_I$[n] and ω$_Q$[n] that vary sinusoidally will result in a round-shape phasor constellation 110 for a 4-phase PI as shown in FIG. 1. In some embodiments, ω$_{max}$ can be $2^{N-2}$.

Alternatively, in some embodiments, 4-phase linear weights can be used as represented by the following equations, in which $$\omega_{max} = \frac{2^N}{4}$$

$$\omega_I[n] = \begin{cases} \omega_{max} - n, & n \in \left[0, \frac{2^N}{2} - 1\right) \\ n - 3*\omega_{max}, & n \in \left[\frac{2^N}{2}, 2^N - 1\right) \end{cases}$$

$$\omega_Q[n] = \begin{cases} n, & n \in \left[0, \frac{2^N}{4} - 1\right) \\ 2*\omega_{max} - n, & n \in \left[\frac{2^N}{4}, \frac{3*2^N}{4} - 1\right) \\ n - 4*\omega_{max}, & n \in \left[\frac{3*2^N}{4}, 2^N - 1\right) \end{cases}$$

An illustration of such linear weights is shown in FIG. 2. Using weights ω$_I$[n] and ω$_Q$[n] that vary based on these equations can result in a diamond-shape phasor constellation 112 for a 4-phase PI as shown in FIG. 1.

As yet another alternative, in some embodiments, 4-phase weights for an octagonal constellation can be used as represented by the following equations:

$$\omega_I[n] = \begin{cases} \frac{3}{4}*2^{N-2} + 0.5, & n \in [0, 2^N/16) \\ \frac{3}{4}*2^{N-2} - 0.5 + \left(\frac{2^N}{16} - n\right), & n \in \left[2^N/16, \frac{7}{16}*2^N\right) \\ -\frac{3}{4}*2^{N-2} - 0.5, & n \in \left[\frac{7}{16}*2^N, \frac{9}{16}*2^N\right) \\ -\frac{3}{4}*2^{N-2} + 0.5 + \left(n - \frac{9}{16}*2^N\right), & n \in \left[\frac{9}{16}*2^N, \frac{15}{16}*2^N\right) \\ \frac{3}{4}*2^{N-2} + 0.5, & n \in \left[\frac{15}{16}*2^N, 2^{N-1}\right) \end{cases}$$

$$\omega_I[n] = \begin{cases} n + 0.5, & n \in \left[0, \frac{3}{16}*2^N\right) \\ \frac{3}{4}*2^{N-2} + 0.5, & n \in \left[\frac{3}{16}*2^N, \frac{5}{16}*2^N\right) \\ \frac{3}{4}*2^{N-2} - 0.5 + \left(\frac{15}{16}*2^N - n\right), & n \in \left[\frac{5}{16}*2^N, \frac{11}{16}*2^N\right) \\ -\frac{3}{4}*2^{N-2} - 0.5, & n \in \left[\frac{11}{16}*2^N, \frac{13}{16}*2^N\right) \\ -\frac{3}{4}*2^{N-2} + 0.5 + \left(n - \frac{13}{16}*2^N\right), & n \in \left[\frac{13}{16}*2^N, 2^N\right) \end{cases}$$

Using weights ω$_I$[n] and ≥$_Q$[n] that vary based on these equations can result in an octagonal phasor constellation 114 for a 4-phase PI as shown in FIG. 1.

Any other suitable number (e.g., three or more) of phase linear weights can be used in some embodiments.

Figure 3:
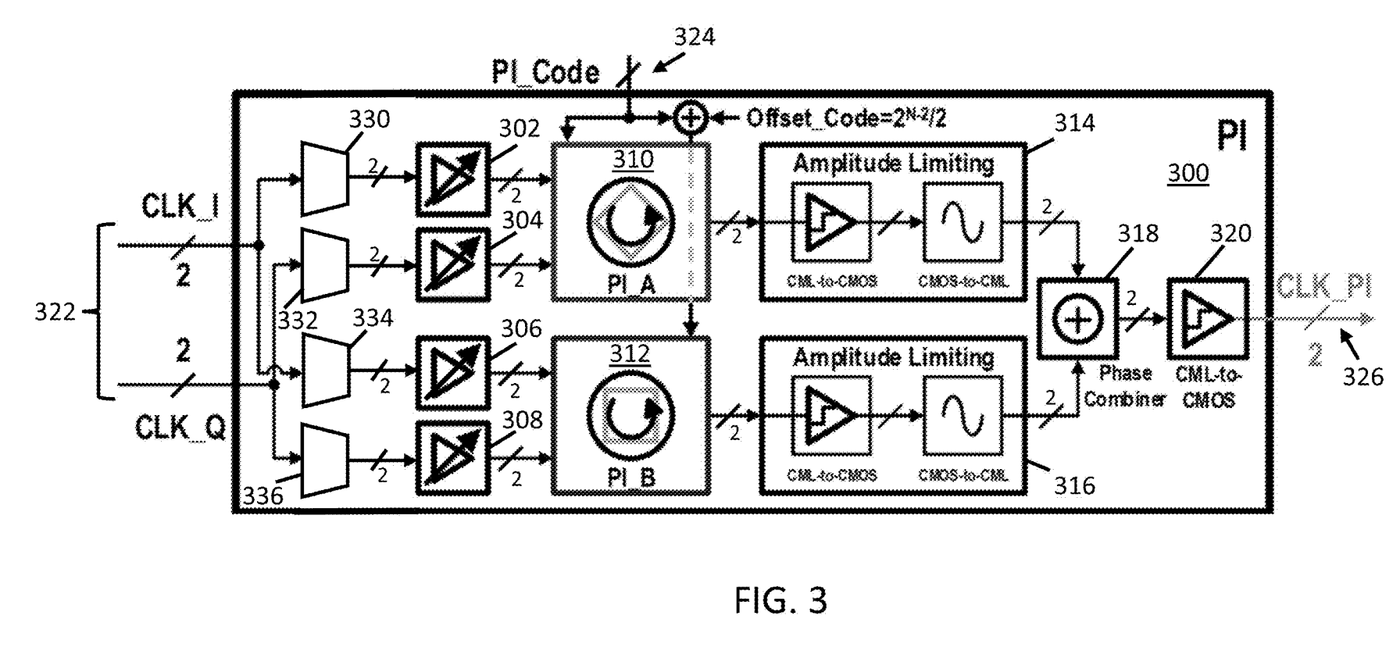
FIG. 3 is an illustration of an example of a phase interpolator in accordance with some embodiments.

Turning to FIG. 3, an example 300 of a PI in accordance with some embodiments is illustrated. As shown, PI 300 includes four programmable buffers 302, 304, 306, and 308, two sub-PIs 310 and 312, amplitude limiters 314 and 316, a phase combiner 318, and a current-mode logic (CML) to complementary metal-oxide-semiconductor (CMOS) (CML-to-CMOS) converter 320. PI 300 receives two differential quadrature clocks 322 and a PI code 324, and outputs differential PI clock 326. In some embodiments, PI 300 can additionally include multiplexers 330, 332, 334, and 336 that can be used to switch the clocks being provided to buffers 302, 304, 306, and 308, respectively, in order to change the quadrant in which non-negative weights operating on CLK_I and CLK_Q can produce a resultant clock.

Figure 6:
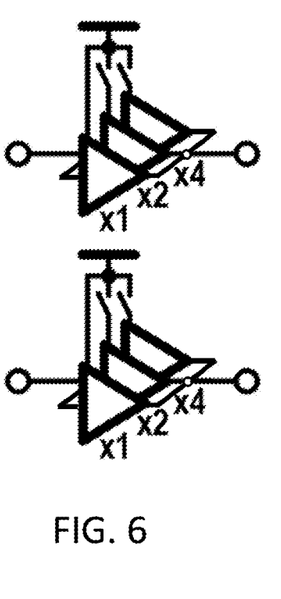
FIG. 6 is an illustration of an example of a programmable buffer that can be used in some embodiments.

Programmable buffers 302, 304, 306, and 308 can be used to ensure that the clocks input to sub-PIs 310 and 312 stay within a desired amplitude (e.g., around 350-m Vpp single-ended) over different operating frequencies (e.g., 3.5 GHz to 11 GHz) by providing higher current as needed. The programmable buffers can be controlled by any suitable controller (not shown), in some embodiments. Any suitable programmable buffers can be used for programmable buffers 302, 304, 306, and 308 in some embodiments. For example, the programmable buffers illustrated in FIG. 6 can be used as programmable buffers 302, 304, 306, and 308 in some embodiments. As shown in FIG. 6, in each programmable buffer, multiple differential buffers are connected in parallel and each of these buffers can be selectively enabled or disabled (as represented by the switches) to increase or decrease the output current provided by the buffer. In some embodiments, programmable buffers can be omitted. In some embodiments, programmable buffers can be replaced with non-programmable buffers.

Sub-PIs 310 and 312 can receive the clock signals output by programmable buffers 302, 304, 306, and 308 and phase interpolate those signals based on PI codes input to each sub-PI. The PI code used for sub-PI 310 can be received from PI code 324. The PI code used for sub-PI 312 can be PI code 324 offset by half of the integral nonlinearity (INL) period of the sub-PI, so that the INL errors of sub-PIs 310 and 312 have opposite signs. More particularly, the PI code used for sub-PI 312 can be PI code 324 offset by half a quadrant, e.g., $2^{N-2}/2$ (i.e., 45 degrees) when used with a 4-phase PI code 324.

Any suitable PIs can be used as sub-PIs 310 and 312 in some embodiments. For example, in some embodiments, the PIs illustrated below in connection with FIGS. 4 and 5 can be used as sub-PIs 310 and 312 in some embodiments.

Figure 7A:
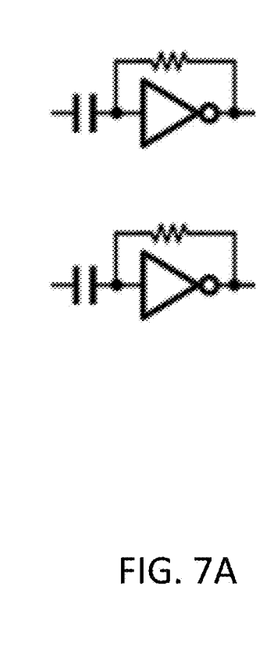
FIGS. 7A and 7B are illustrations of examples of a current-mode logic (CML) to complementary metal-oxide-semiconductor (CMOS) (CML-to-CMOS) converter and a CMOS-to-CML converter, respectively, that can be used in some embodiments.
Figure 7B:
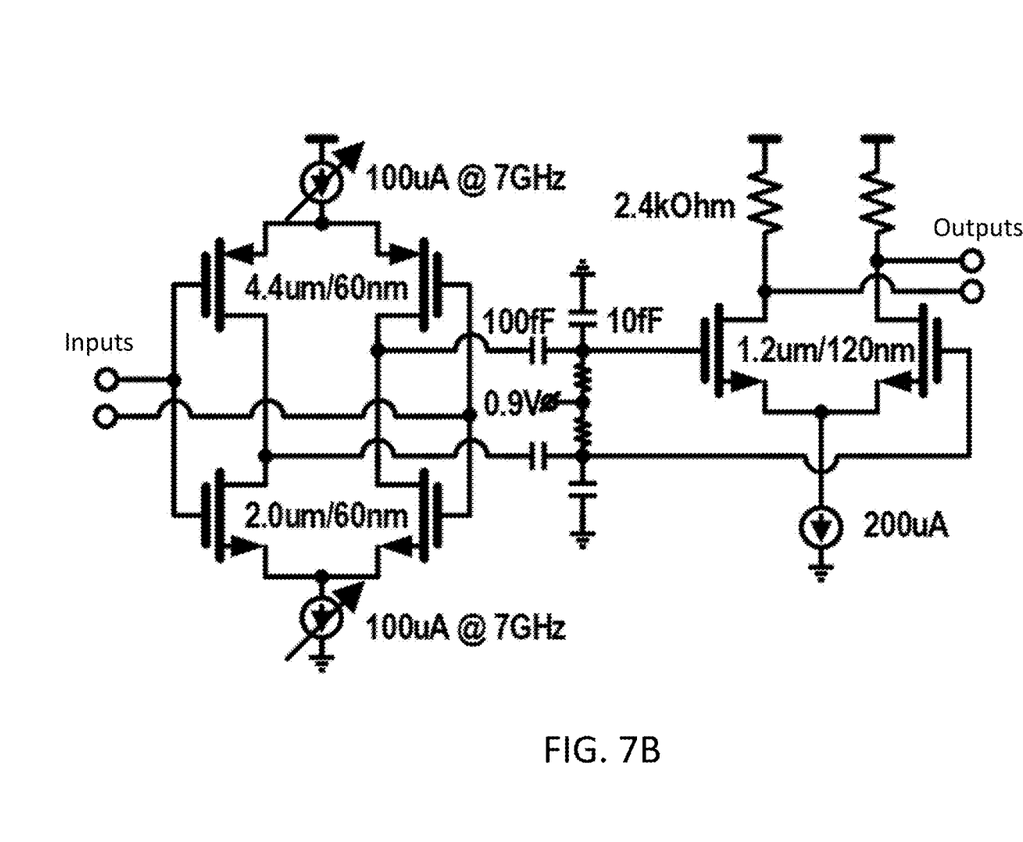

Amplitude limiters 314 and 316 can be used to equalize the sub-PIs' output amplitudes in some embodiments. Any suitable circuits can be used as amplitude limiters 314 and 316 in some embodiments. For example, in some embodiments, amplitude limiters 314 and 316 can be implemented using CML-to-CMOS converters and CMOS-to-CML converters as shown. More particularly, for example, in some embodiments, each of amplitude limiters 314 and 316 can be implemented as shown in FIGS. 7A (the CML-to-CMOS converter) and 7B (the CMOS-to-CML converter).

Figure 8:
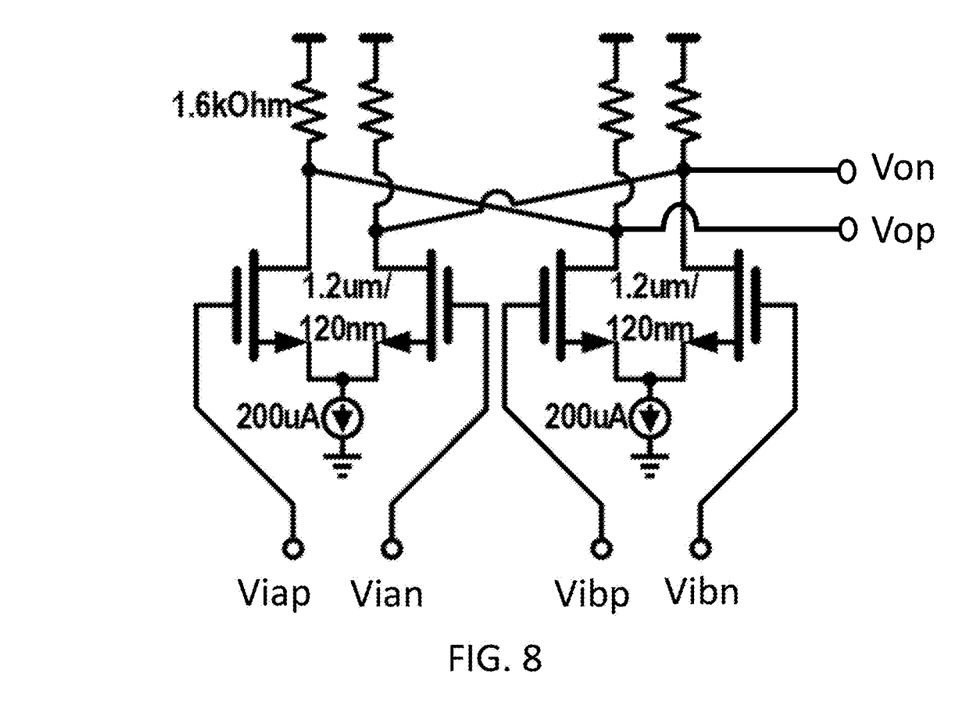
FIG. 8 is an illustration of an example of a phase combiner that can be used in some embodiments.

Phase combiner 318 can be used to sum the outputs of amplitude limiters 314 and 316, in some embodiments. Summing the outputs from the two sub-PIs after limiting their outputs to the same amplitude can be used to cancel the major part of the INL errors, in some embodiments. Any suitable phase combiner can be used as phase combiner 318, in some embodiments. For example, in some embodiments, the phase combiner shown in FIG. 8 can be used as phase combiner 318. As shown in FIG. 8, the signals corresponding to PI 310 can be input to the phase combiner using input Viap and Vian, the signals corresponding to PI 312 can be input to the phase combiner using input Vibp and Vibn, and the outputs of the phase combiner can be provided at outputs Vop and Von.

Finally, the CML-to-CMOS converter 320 converts the current-mode logic signals output by phase combiner 318 to CMOS PI clock signals 326 and amplifies the PI's output to a rail-to-rail clock. Any suitable CML-to-CMOS converter can be used CML-to-CMOS converter 320 in some embodiments. For example, in some embodiments the CML-to-CMOS converter shown in FIG. 7A can be used to implement a CML-to-CMOS converter 320.

As mentioned above, multiplexers 330, 332, 334, and 336 can be used to switch the clocks being provided to buffers 302, 304, 306, and 308, respectively, in order to change the quadrant in which non-negative weights operating on CLK_I and CLK_Q can produce a resultant clock. Any suitable multiplexers can be used in some embodiments. For example, in some embodiments, transmission gates and suitable logic (for converting control signals to the multiplexers into suitable controls for the transmission gates) can be used to implement multiplexers 330, 332, 334, and 336.

Figure 4:
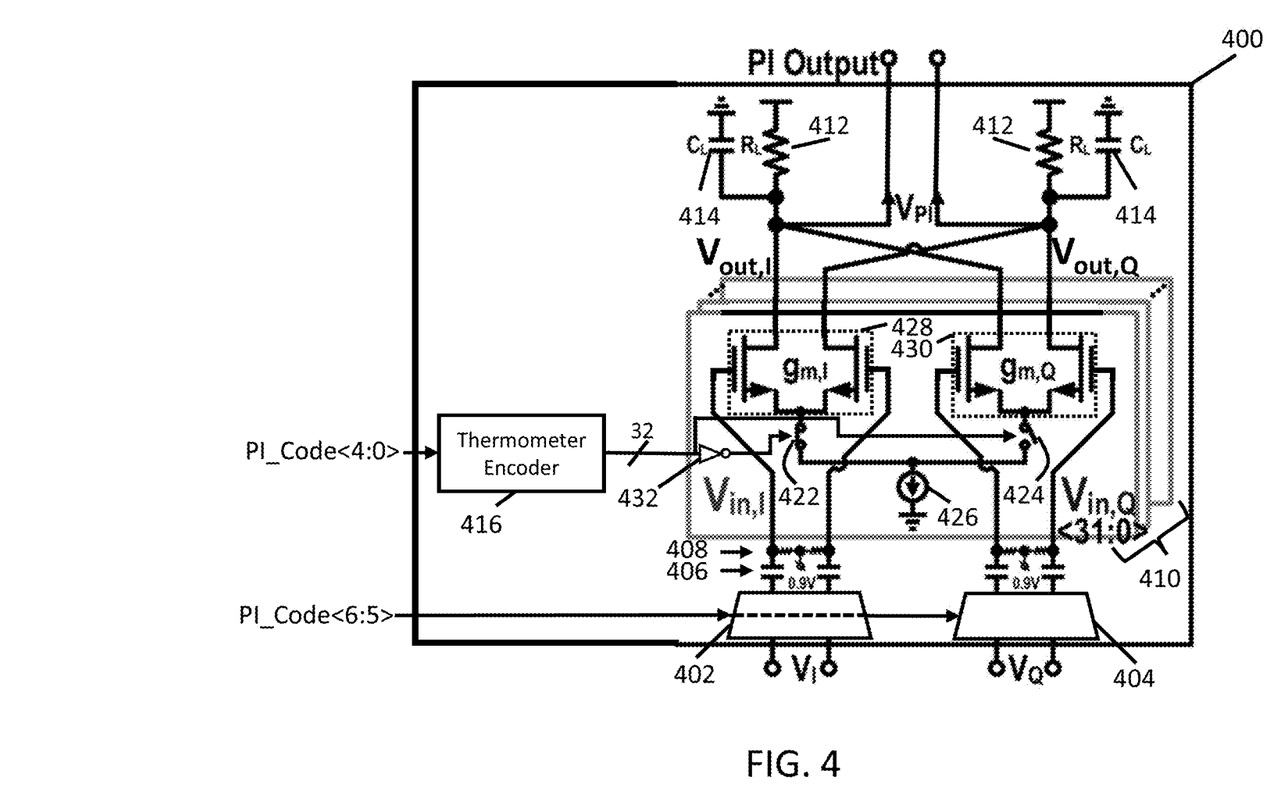
FIG. 4 is an illustration of an example of a sub-phase interpolator that can be used in some embodiments.

Turning to FIG. 4, an example 400 of a sub-PI that can be used to implement sub-PIs 310 and 312 in accordance with some embodiments is illustrated. As shown, sub-PI 400 can include multiplexers 402 and 404, capacitors 406, bias resistors 408, PI slices 410, load resistors 412, load capacitors 414, and a thermometer encoder 416.

Multiplexers 402 and 404 can be used to switch the clocks being provided to slices 410 in order to change the quadrant in which non-negative weights operating on clocks input to the slices can produce a resultant clock. As shown in FIG. 4, multiplexers 402 and 404 can be provided as part of each sub-PI in some embodiments. Alternatively, in other embodiments, multiplexers can be provided as multiplexers 330, 332, 334, and 336 as part of PI 100. In some embodiments, both multiplexers 402 and 404 and multiplexers 330, 332, 334, and 336 can be omitted as discussed further in connection with FIG. 5. When used, in some embodiments, multiplexers (whether as multiplexers 402 and 404 or multiplexers 330, 332, 334, and 336) can be controlled by the two MSBs of the N-bit PI code corresponding to each sub-PI as described above in connection with FIG. 1. For example, for a 7-bit PI code, bits 6 and 5 of each sub-PI's corresponding PI code can be used to control the multiplexers.

Any suitable multiplexers can be used in some embodiments. For example, in some embodiments, transmission gates and suitable logic (for converting control signals to the multiplexers into suitable controls for the transmission gates) can be used to implement multiplexers 402 and 404.

Capacitors 406 can be used to AC couple the clocks input to sub-PI 400 to slices 410. Any suitable capacitors can be used as capacitors 406 in some embodiments.

Resistors 408 can be used to DC bias inputs $V_{in,I}$ and $V_{in,Q}$ to slices 410. Any suitable resistors can be used as resistors 408 in some embodiments.

Slices 410 can be used to apply weights to the clocks input to slices 410 at inputs $V_{in,I}$ and $V_{in,Q}$. More particularly, the number of current sources (described below) connected to the I branch ($V_{out,I}$) or the Q branch ($V_{out,Q}$) controls the effective transconductance $g_{m,I}$ and $g_{m,Q}$ for clock weights $\omega_I$ and $\omega_Q$.

Inputs $V_{in,I}$ and $V_{in,Q}$ for slices 410 are connected in parallel and outputs $V_{out,I}$ and $V_{out,Q}$ for slices 410 are connected in parallel. Any suitable number of slices can be provided in some embodiments. For example, in some embodiments, $2^{N-X}$ slices can be provided, where N is the number of bits of sub-PI 400 and X is the number of bits used to control the multiplexers (where $2^X$ is the number of phases under multiplexing). As a more particular example, if the number of bits of sub-PI 400 is 7 and 2 bits are used to control multiplexers, 32 slices 410 can be provided and the 5 LSBs of the PI code corresponding to each sub-PI can be input to thermometer encoder 416 and each of its 32 outputs provided to a corresponding slice of the 32 slices 410.

Each slice 410 can include switches 422 and 424, a current source 426, differential pairs 428 and 430, and an inverter 432.

Switches 422 and 424 can be implemented in any suitable manner, such as using NMOS FETs. The switches can be controlled based upon the output of thermometer encoder 416 and inverter 432. As shown in FIG. 4, each slice 410 receives a corresponding output of thermometer encoder 416 and inverts it using inverter 432. The inverter output controls switch 422 and the thermometer encoder output controls switch 424 so that switch 422 is off when switch 424 is on and vice versa. Which switch receives the inverter output and the thermometer encoder output can be reversed, in some embodiments.

Current source 426 can be any suitable current source in some embodiments.

Differential pairs 428 and 430 can be implemented using any suitable components, such as NMOS FETs, in some embodiments.

Load resistor 412 can be any suitable resistor in some embodiments.

Capacitors 414 can be any suitable capacitor in some embodiments.

Thermometer encoder 416 can be any suitable thermometer encoder in some embodiments.

Figure 5:
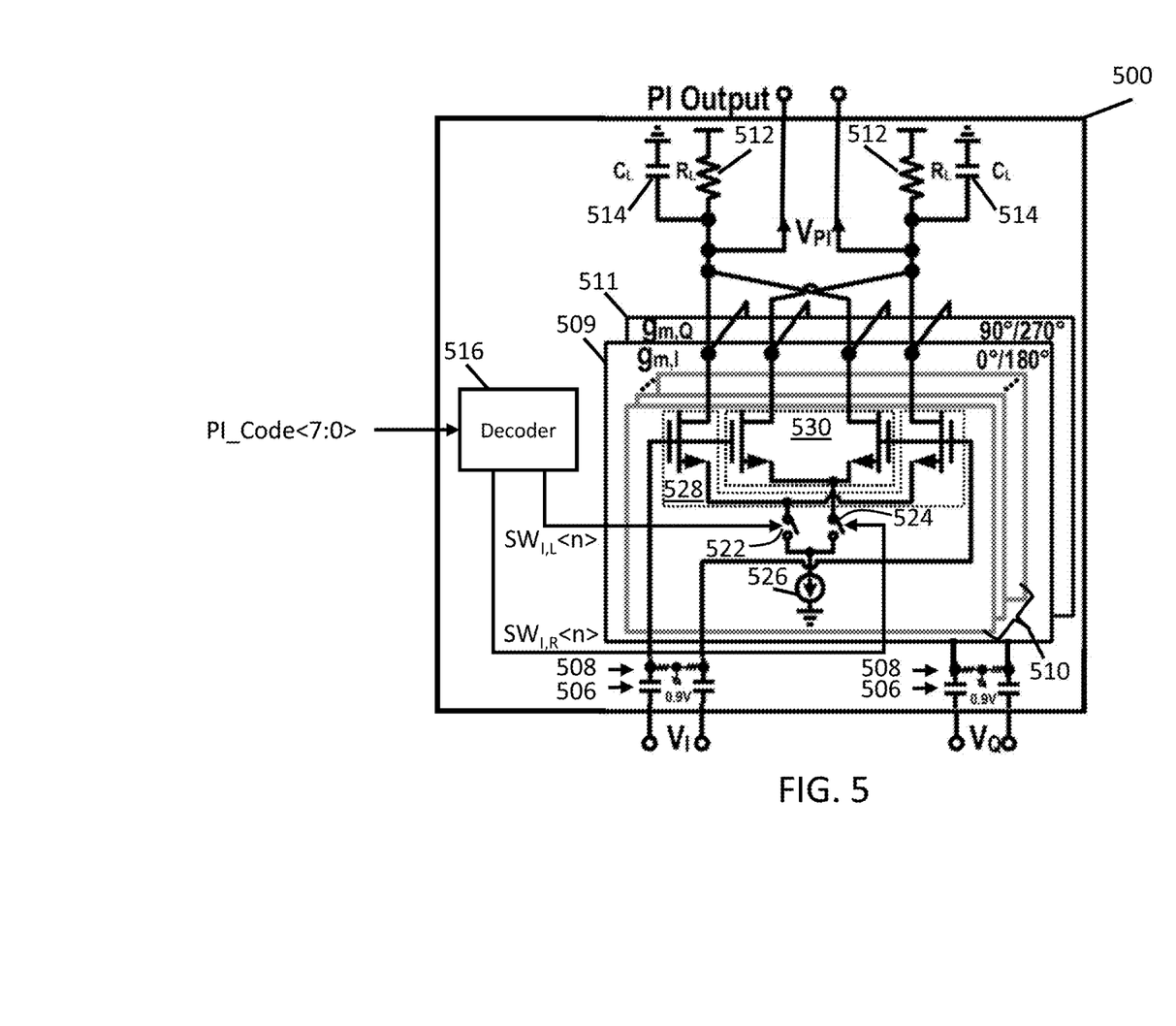
FIG. 5 is an illustration of another example of a sub-phase interpolator that can be used in some embodiments.

Turning to FIG. 5, an example 500 of a sub-PI that can be used to implement sub-PIs 310 and 312 in accordance with some embodiments is illustrated. As shown, sub-PI 500 can include capacitors 506, bias resistors 508, an I bank 509, a Q bank 511, load resistors 512, load capacitors 514, and a decoder 516.

Capacitors 506 can be used to AC couple the clocks input to sub-PI 500 to slices 510. Any suitable capacitors can be used as capacitors 506 in some embodiments.

Resistors 508 can be used to DC bias inputs $V_I$ and $V_Q$ to slices 510. Any suitable resistors can be used as resistors 508 in some embodiments.

Each of banks 509 and 511 can include slices 510. The inputs to slices 510 of bank 509 can be connected in parallel to $V_I$ via the corresponding capacitors 506. Likewise, the inputs to slices 510 of bank 511 can be connected in parallel to $V_Q$ via the corresponding capacitors 506. The outputs for slices 510 of banks 509 and 511 can be connected in parallel as shown in FIG. 5.

Slices 510 can be used to apply weights to the clocks input to slices 510.

Any suitable number of slices can be provided in some embodiments. For example, in some embodiments, $2^{N-2}$ slices can be provided, where N is the number of bits of sub-PI 500. As a more particular example, if the number of bits of sub-PI 500 is 7, 32 slices 510 can be provided, the PI code corresponding to each sub-PI can be input to decoder 516, a pair of signals $SW_{I,L}<n>$ and $SW_{I,R}<n>$ can be provided to each slice n 510 in bank 509, and a pair of signals $SW_{Q,L}<n>$ and $SW_{Q,R}<n>$ can be provided to each slice n 510 in bank 511, where n=0 . . . 31.

Each slice 510 can include switches 522 and 524, a current source 526, and differential pairs 528 and 530.

Switches 522 and 524 can be implemented in any suitable manner, such as using NMOS FETs.

Current source 526 can be any suitable current source in some embodiments.

Differential pairs 528 and 530 can be implemented using any suitable components, such as NMOS FETs, in some embodiments.

Load resistor 512 can be any suitable resistor in some embodiments.

Capacitors 514 can be any suitable capacitor in some embodiments.

Decoder 516 can be any suitable decoder in some embodiments. For example, decoder 516 can be implemented to provide thermometer-encoded outputs for $SW_{I,L}<n>$, $SW_{I,R}<n>$, $SW_{Q,L}<n>$, and $SW_{Q,R}<n>$ as shown in the following table. As illustrated, based on the input bits to the decoder, outputs for $SW_{I,L}<n>$, $SW_{I,R}<n>$, $SW_{Q,L}<n>$, and $SW_{Q,R}<n>$ are provided and a quadrant selected.

|  | Input bits | $SW_{I,L}<31:0>$ | $SW_{I,R}<31:0>$ | $SW_{Q,L}<31:0>$ | $SW_{Q,R}<31:0>$ |
|---|---|---|---|---|---|
| Quadrant 1 | 7'b0000000 | 32'hFFFFFFFF | 32'h00000000 | 32'h00000000 | 32'h00000000 |
|  | 7'b0000001 | 32'hFFFFFFFE | 32'h00000001 | 32'h00000000 | 32'h00000000 |
|  | 7'b0000010 | 32'hFFFFFFFC | 32'h00000000 | 32'h00000003 | 32'h00000000 |
|  | 7'b0000011 | 32'hFFFFFFF8 | 32'h00000000 | 32'h00000007 | 32'h00000000 |
|  | 7'b0000100 | 32'hFFFFFFF0 | 32'h00000000 | 32'h0000000F | 32'h00000000 |
|  | 7'b0000101 | 32'hFFFFFFE0 | 32'h00000000 | 32'h0000001F | 32'h00000000 |
|  | 7'b0000110 | 32'hFFFFFFC0 | 32'h00000000 | 32'h0000003F | 32'h00000000 |
|  | 7'b0000111 | 32'hFFFFFF80 | 32'h00000000 | 32'h0000007F | 32'h00000000 |
|  | . . . | . . . | . . . | . . . | . . . |
| Quadrant 2 | 7'b0100000 | 32'h00000000 | 32'h00000000 | 32'hFFFFFFFF | 32'h00000000 |
|  | 7'b0100001 | 32'h00000000 | 32'h00000001 | 32'hFFFFFFFE | 32'h00000000 |
|  | 7'b0100010 | 32'h00000000 | 32'h00000003 | 32'hFFFFFFFC | 32'h00000000 |
|  | 7'b0100011 | 32'h00000000 | 32'h00000007 | 32'hFFFFFFF8 | 32'h00000000 |
|  | 7'b0100100 | 32'h00000000 | 32'h0000000F | 32'hFFFFFFF0 | 32'h00000000 |
|  | 7'b0100101 | 32'h00000000 | 32'h0000001F | 32'hFFFFFFE0 | 32'h00000000 |
|  | 7'b0100110 | 32'h00000000 | 32'h0000003F | 32'hFFFFFFC0 | 32'h00000000 |
|  | 7'b0100111 | 32'h00000000 | 32'h0000007F | 32'hFFFFFF80 | 32'h00000000 |
|  | . . . | . . . | . . . | . . . | . . . |
| Quadrant 3 | 7'b1000000 | 32'h00000000 | 32'hFFFFFFFF | 32'h00000000 | 32'h00000000 |
|  | 7'b1000001 | 32'h00000000 | 32'hFFFFFFFE | 32'h00000000 | 32'h00000001 |
|  | 7'b1000010 | 32'h00000000 | 32'hFFFFFFFC | 32'h00000000 | 32'h00000003 |
|  | 7'b1000011 | 32'h00000000 | 32'hFFFFFFF8 | 32'h00000000 | 32'h00000007 |
|  | 7'b1000100 | 32'h00000000 | 32'hFFFFFFF0 | 32'h00000000 | 32'h0000000F |
|  | 7'b1000101 | 32'h00000000 | 32'hFFFFFFE0 | 32'h00000000 | 32'h0000001F |
|  | 7'b1000110 | 32'h00000000 | 32'hFFFFFFC0 | 32'h00000000 | 32'h0000003F |
|  | 7'b1000111 | 32'h00000000 | 32'hFFFFFF80 | 32'h00000000 | 32'h0000007F |
|  | . . . | . . . | . . . | . . . | . . . |
| Quadrant 4 | 7'b1100000 | 32'h00000000 | 32'h00000000 | 32'h00000000 | 32'hFFFFFFFF |
|  | 7'b1100001 | 32'h00000001 | 32'h00000000 | 32'h00000000 | 32'hFFFFFFFE |
|  | 7'b1100010 | 32'h00000003 | 32'h00000000 | 32'h00000000 | 32'hFFFFFFFC |
|  | 7'b1100011 | 32'h00000007 | 32'h00000000 | 32'h00000000 | 32'hFFFFFFF8 |
|  | 7'b1100100 | 32'h0000000F | 32'h00000000 | 32'h00000000 | 32'hFFFFFFF0 |
|  | 7'b1100101 | 32'h0000001F | 32'h00000000 | 32'h00000000 | 32'hFFFFFFE0 |
|  | 7'b1100110 | 32'h0000003F | 32'h00000000 | 32'h00000000 | 32'hFFFFFFC0 |

| Input bits | SW$_{I,L}$<31:0> | SW$_{I,R}$<31:0> | SW$_{Q,L}$<31:0> | SW$_{Q,R}$<31:0> |
|---|---|---|---|---|
| 7'b1100111 | 32'h0000007F | 32'h00000000 | 32'h00000000 | 32'hFFFFFF80 |
| ... | ... | ... | ... | ... |

Figure 9:
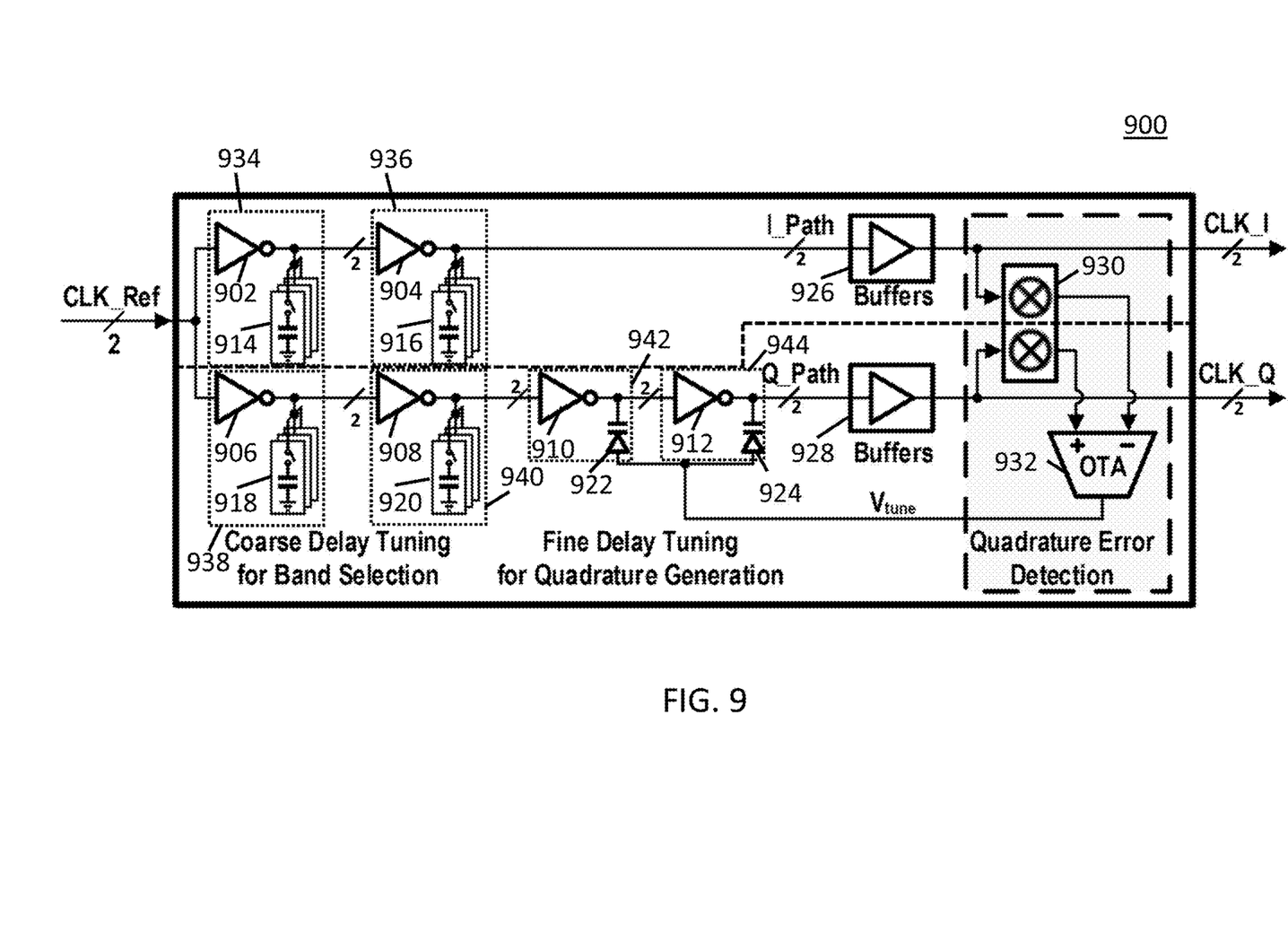
FIG. 9 is an illustration of an example of a delta quadrature delay locked loop in accordance with some embodiments.

Turning to FIG. 9, an example 900 of a delta quadrature delay-locked loop (delta QDLL) in accordance with some embodiments is illustrated. Delta QDLL 900 can be used to generate 4-phase clocks (CLK_I and CLK_Q) that can be input to PI 100 based on a differential reference clock (CLK_Ref) in accordance with some embodiments.

Delta QDLL 900 can generate quadrature clocks from the delay difference of two parallel delay paths (an I path and a Q path, shown as separated by the dashed line in FIG. 9) with a background analog quadrature tuning loop, in some embodiments.

As shown, delta QDLL 900 includes differential inverters 902, 904, 906, 908, 910, and 912, switched load capacitor arrays 914, 916, 918, and 920, differential varactors 922 and 924, buffers 926 and 928, passive mixers 930, and an operational transconductance amplifier 932.

Coarse-delay tuning cells 934, 936, 938, and 940 are provided in both paths for band selection in some embodiments. Although two coarse-delay tuning cells are shown in each path, any suitable number of cells, including none, can be provided on one or more of the paths in accordance with some embodiments.

As shown: cell 934 includes differential inverter 902 and switched load capacitor array 914; cell 936 includes differential inverter 904 and switched load capacitor array 916; cell 938 includes differential inverter 906 and switched load capacitor array 918; and cell 940 includes differential inverter 908 and switched load capacitor array 920.

Differential inverters 902, 904, 906, and 908 can be any suitable differential inverters in some embodiments.

Switched load capacitor arrays 914, 916, 918, and 920 can be formed from any suitable switched capacitors in some embodiments. For example, in some embodiments, the switches can be implemented using NMOS FETs that are controlled by any suitable controller (not shown). Any suitable number of slices, such as three, can be provided in switched load capacitor arrays 914, 916, 918, and 920, in some embodiments.

Varactor-based delay cells 942 and 944 are provided in the Q branch for fine delay-difference tuning in some embodiments.

Differential inverters 910 and 912 can be any suitable differential inverters in some embodiments.

Differential varactors 922 and 924 can be any suitable varactors in some embodiments.

Buffers 926 and 928 can be provided to drive the mixers and subsequent load like PI 400 in some embodiments.

An analog quadrature tuning loop extracts the delay difference error with passive mixers and minimizes it thanks to its negative feedback configuration and its loop gain. As shown, this loop includes a passive mixer 930, an operational transconductance amplifier 932, and varactor-based delay cells 942 and 944.

Figure 10:
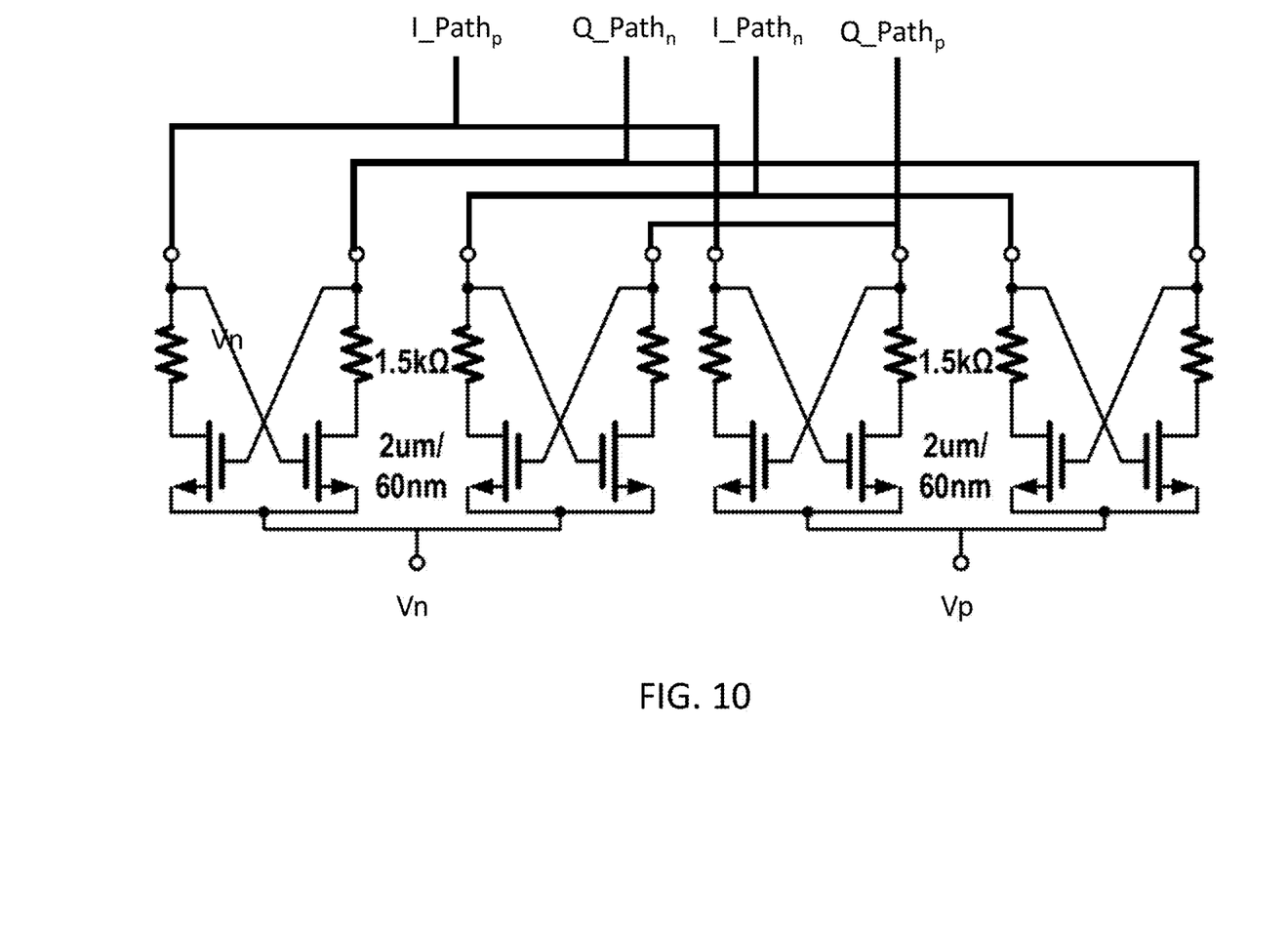
FIG. 10 is an illustration of an example of passive mixers that can be used in some embodiments.

Passive mixers 930 can be any suitable differential passive mixers in some embodiments. For example, in some embodiments, passive mixers can be implemented using the passive mixers of FIG. 10. In such case, the outputs of buffer 926 can be provided to inputs I_Path$_p$ and I_Path$_n$, the outputs of buffer 928 can be provided to inputs Q_Path$_p$ and Q_Path$_n$, and the outputs of the passive mixers that are input to operational transconductance amplifier 932 can be provided at Vp and Vn, as shown in FIG. 10, in some embodiments. As shown, resistors of 1.5 kΩ can be inserted in series with the NMOS switches in the passive mixers to improve clock isolation, in some embodiments.

Figure 11:
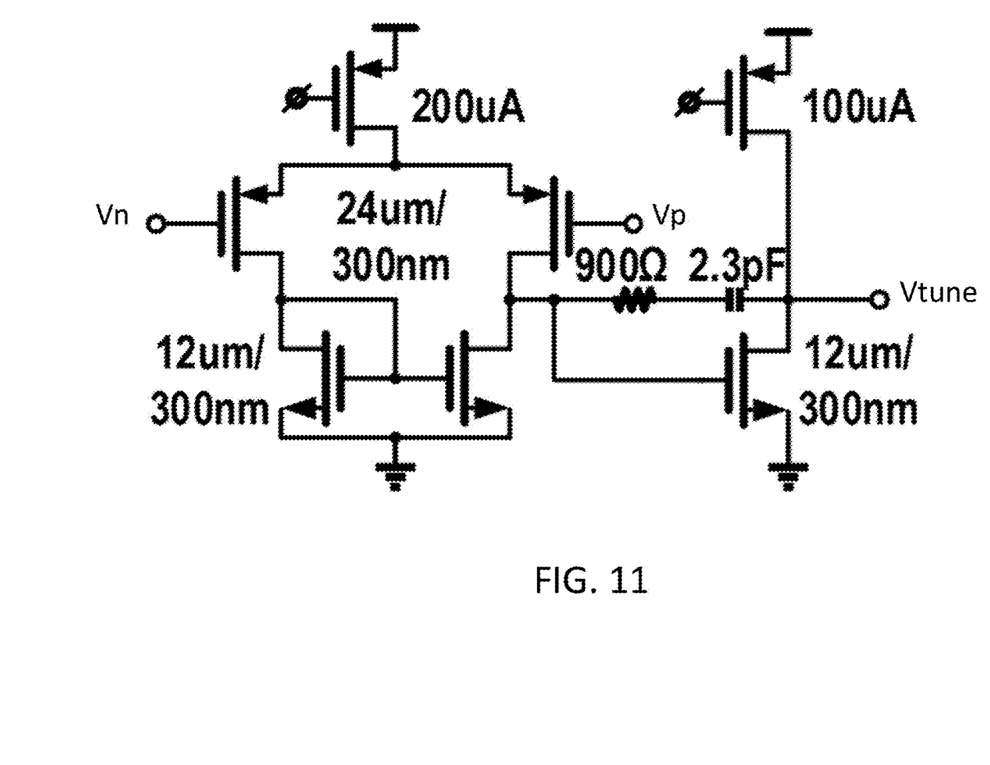
FIG. 11 is an illustration of an example of an operational transconductance amplifier that can be used in some embodiments.

Operational transconductance amplifier 932 can be any suitable operational transconductance amplifier in some embodiments. For example, in some embodiments, operational transconductance amplifier 932 can be implemented using the operational transconductance amplifier of FIG. 11. In such case, the outputs of passive mixers 930 can be provided to the inputs of the operational transconductance amplifier at Vp and Vn and the output of the operational transconductance amplifier that is input to varactors 922 and 924 can be provided at Vtune, as shown in FIG. 11, in some embodiments.

Figure 12:
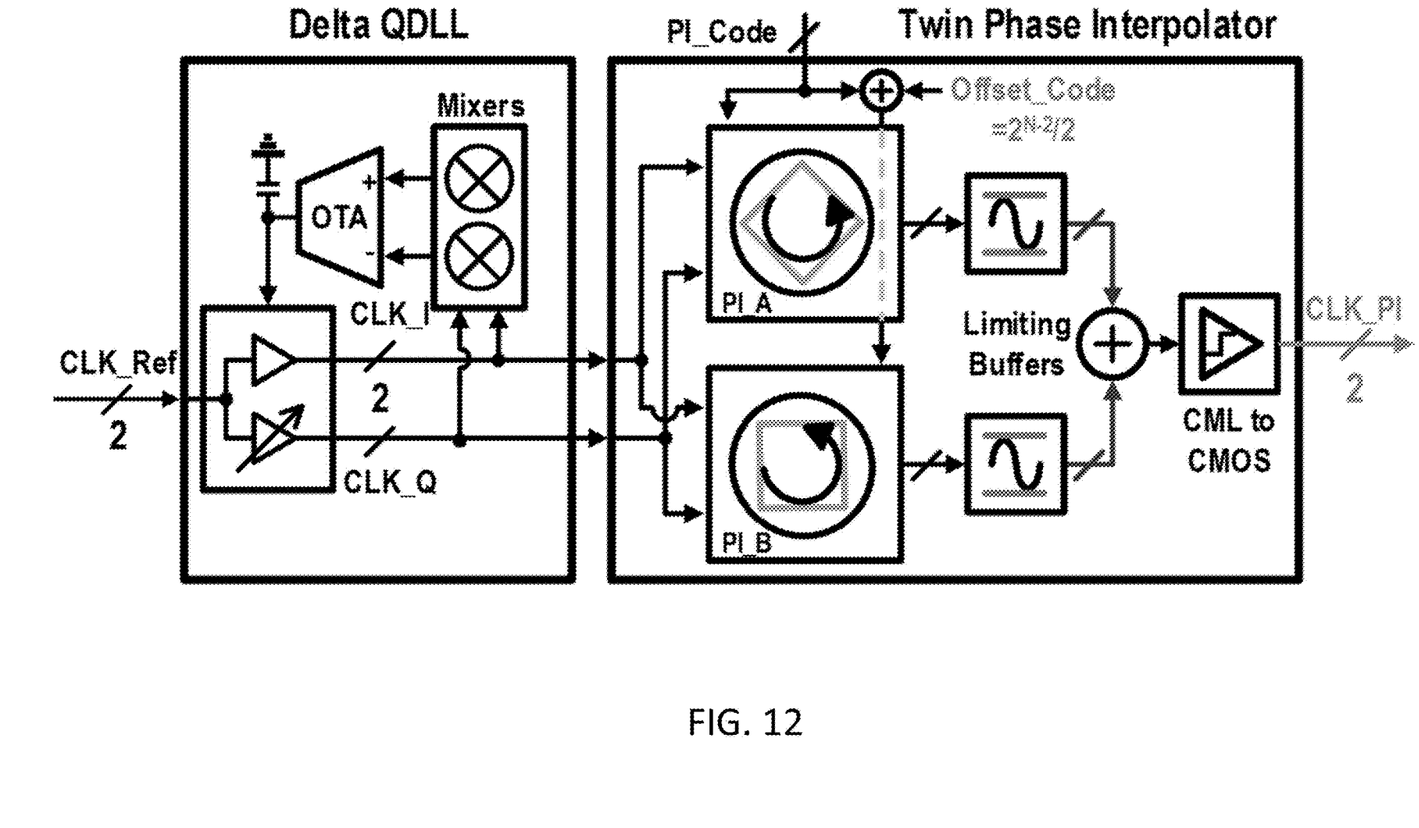
FIG. 12 is an illustration of an example of a delta quadrature delay locked loop providing clock signals to a phase interpolator in accordance with some embodiments.

As noted above, in some embodiments, delta QDLL 900 can be used to generate 4-phase clocks to be provided to PI 100. An illustration of this is shown in FIG. 12.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit, comprising:
 a first phase interpolator having a first output that outputs a first interpolated clock signal based on quadrature clock signals and a first phase interpolator control signal;
 a second phase interpolator having a second output that outputs a second interpolated clock signal based on the quadrature clock signals and a second phase interpolator control signal that is shifted from the first phase interpolator control signal by half of an integral non-linearity (INL) period of the first phase interpolator; and
 a phase combiner that outputs a third interpolated clock signal based on the first interpolated clock signal and the second interpolated clock signal.

2. The circuit of claim 1, further comprising a first amplitude limiter that receives the first interpolated clock signal and outputs a first amplitude-limited interpolated clock signal that is provided to the phase combiner.

3. The circuit of claim 1, further comprising a second amplitude limiter that receives the second interpolated clock signal and outputs a second amplitude-limited interpolated clock signal that is provided to the phase combiner.

4. The circuit of claim 1, further comprising a programmable buffer that receives clock signals and provides to the first phase interpolator one of the quadrature clock signals.

5. The phase interpolator circuit of claim 1, further comprising a multiplexer that receives a pair of input clock signals and outputs a pair of multiplexed clock signals having opposite phases from the pair of input clock signals.

6. The circuit of claim 1, wherein the first phase interpolator comprises a first differential pair having inputs coupled to one of the quadrature clock signals and outputs coupled to the first output.

7. The circuit of claim 6, wherein the first phase interpolator further comprises a second differential pair having inputs coupled to another of the quadrature clock signals and outputs coupled to the first output.

8. The circuit of claim 1, wherein the first phase interpolator comprises a plurality of slices each comprising a first differential pair having inputs coupled to one of the quadrature clock signals and outputs coupled to the first output, and wherein the plurality of slices contribute to the first output based on first phase interpolator control signal.

9. The circuit of claim 8, wherein the first phase interpolator further comprises a multiplexer.

10. A circuit of claim 1, wherein the quadrature clock signals comprise a first output clock signal and a second output clock signal, and wherein the circuit further comprises:
a first passive mixer that mixes a pair of differential quadrature clock signals to produce the first output clock signal;
a second passive mixer that mixes the pair of differential quadrature clock signals to produce the second output clock signal; and
an operational transconductance amplifier that receives the first output clock signal and the second output clock signal and the produces a feedback signal that controls the one of the pair of differential clock signals.

11. The circuit of claim 10, further comprising a delay cell that receives the feedback signal and controls the one of the pair of differential clock signals based on the feedback signal.

12. The circuit of claim 11, wherein the delay cell comprises:
a differential inverter that outputs the one of the pair of differential clock signals at outputs of the differential inverter; and
a differential varactor coupled to the output of the differential inverter and coupled to the feedback signal.

13. The circuit of claim 10, further comprising a delay cell that comprises:
a differential inverter; and
a switched load capacitor array connected to the output of the differential inverter,
wherein an output of the delay cell produces a delayed clock signal upon which one of the differential quadrature clock signals is based.

* * * * *